United States Patent [19]

Melnyk

[11] 4,167,401

[45] Sep. 11, 1979

[54] SCRUBBER HAVING FIXED THROAT VENTURI AND ADJUSTABLE PLUG

[75] Inventor: George G. Melnyk, Seven Hills, Ohio

[73] Assignee: Arthur G. McKee & Company, Cleveland, Ohio

[21] Appl. No.: 837

[22] Filed: Jan. 4, 1979

[51] Int. Cl.² .............................................. B01D 47/10
[52] U.S. Cl. ...................................... 55/224; 55/226; 261/62; 261/63; 261/DIG. 54
[58] Field of Search ................... 261/62, 63, 109, 112, 261/116, 118, DIG. 9, DIG. 54; 55/224, 226, 230, 240, 241

[56] References Cited

U.S. PATENT DOCUMENTS

| | | | |
|---|---|---|---|
| 1,351,477 | 8/1920 | Hodges | 261/63 X |
| 3,199,267 | 8/1965 | Hausberg | 55/210 |
| 3,317,197 | 5/1967 | Lohner et al. | 261/DIG. 54 |
| 3,544,086 | 12/1970 | Willett | 261/62 |
| 3,567,194 | 3/1971 | Shah et al. | 261/DIG. 54 |
| 3,584,440 | 6/1971 | Vigil | 261/DIG. 54 |
| 3,601,374 | 8/1971 | Wheeler | 261/62 |
| 3,638,925 | 2/1972 | Braemer | 261/DIG. 54 |
| 3,648,440 | 3/1972 | Egan | 261/DIG. 54 |
| 3,690,044 | 9/1972 | Boresta | 55/223 |
| 3,767,174 | 10/1973 | Heeney | 261/62 |
| 3,802,161 | 4/1974 | Talbert | 261/63 X |
| 3,844,744 | 10/1974 | Hausberg et al. | 261/DIG. 54 |
| 3,854,908 | 12/1974 | Hausberg et al. | 261/DIG. 54 |
| 3,976,454 | 8/1976 | Hausberg et al. | 261/DIG. 54 |
| 4,057,602 | 11/1977 | Kolm | 261/DIG. 54 |

FOREIGN PATENT DOCUMENTS 530689 2/1977 U.S.S.R. .......................... 261/DIG. 54

*Primary Examiner*—Richard L. Chiesa
*Attorney, Agent, or Firm*—Bosworth, Sessions & McCoy

[57] ABSTRACT

Apparatus is disclosed for scurbbing contaminants from a gas steam. The apparatus includes a vertically extending cylinrical vessel having an upper gas steam inlet and a lower gas steam outlet. Means are provided for forming an annular venturi gas flow passage fixed within the vessel, and a central opening. A vertically movable plug is supported within the central opening. The plug has a variable cross section and is movable between a position in which the plug closes the central opening and other positions in which portions of the gas stream flow around the plug and through a secondary annular gas flow passage formed within the central opening. A scrubbing liquid supply means is provided above the plug at the center line of the cylindrical vessel. The scrubbing apparatus combines the high efficiency of a fixed-throat venturi scrubber with the compactness, simple construction and low-cost of a plug-type scrubber.

17 Claims, 3 Drawing Figures

SCRUBBER HAVING FIXED THROAT VENTURI AND ADJUSTABLE PLUG

BACKGROUND OF THE INVENTION

This invention relates to an improved apparatus for the scrubbing of a gas stream to remove entrained solid particles and other solid and condensable gaseous contaminants such as mist, or noxious gaseous compounds, and sulphur dioxide.

Industrial or commercial facilities often generate hot waste gas streams which are discharged to the atmosphere. These streams are generally ladened with entrained solids, mist, or gaseous contaminants such as sulphur dioxide, which must be removed prior to discharge into the atmosphere in order to reduce or prevent air pollution or to recover valuable entrained components. In recent years, more stringent air pollution regulations have been enacted in many communities, which have necessitated the provision of more efficient and effective facilities and apparatus for treating waste gases to remove entrained and contained contaminants and prevent or substantially reduce air pollution.

Generally, there have been two basic types of methods of extracting solid particles from gas streams, the dry process and the wet process. The dry process typically contemplates the use of electric precipitators or some type of filter or screening means, such as passing the gas through a dust bag. In many instances, the installation of conventional dry process equipment such as bag filters, is usually not warranted due to the cost of such facilities. Another dry process includes the use of cyclonic type separators. Dry processes are usually satisfactory if the entrained solid particles are relatively large, but these processes are not very successful when the entrained solid products are small, particularly when the solids are in submicron range. Electric precipitators are successful in extracting small particles, but these precipitators are usually prohibitively expensive when large gas volumes are involved.

Separators or scrubbers using a wet process are usually more effective in extracting solid particles of small dimension. Known wet scrubbers include means for passing gas through apparatus which include areas in which the gas is contacted by liquids. Water is the usual scrubbing liquid. This apparatus provides an intimate mixture of the scrubbing liquid and the gas to be treated. The apparatus is designed so that as the gas flows through the apparatus, it separates the liquid into extremely small liquid particles which contact the small solid particles entrained in the gas. Thereafter, the physical mixture of gas and entrained particles of scrubbing liquid containing the trapped solid particles and materials dissolved from the gas by the liquid is passed to an apparatus that separates the liquid particles from the gas. This apparatus may be, for example, a conventional moisture eliminator.

Conventional wet scrubbing apparatus is usually built with a specific combination of dimensions that are designed for a particular optimum rate of gas flow within a narrow range of flow rates. In order to secure maximum efficiency, each such scrubber must be designed and constructed for a specific flow rate. Any change in the flow rate or other perimeter of the scrubbing system, such as changes in gas or liquid pressures, size, weight and distribution of entrained particles, results in the apparatus functioning at less than its maximum designed effectiveness and efficiency. The construction of gas scrubbers has heretofore required specially designed apparatus having specifically dimensioned components and such scrubbers do not operate efficiently when the gas flow is below or exceeds the limited range for which the scrubber is designed. The prior art scrubbers generally fail to adequately compensate for variations in gas flow rate, such as is encountered in periodic cyclic or batch type processes which generate or discharge gas streams at varying or intermittent flow rates.

Various scrubbing apparatus have been designed which include vertically adjustable plugs which vary the throat of an adjustable angular venturi passage and thereby adjust the gas flow and pressure drop through the scrubber. Such scrubbers are shown in U.S. Pat. No. 3,544,086, U.S. Pat. No. 3,601,374, U.S. Pat. No. 3,690,044, U.S. Pat. No. 3,767,174, U.S. Pat. No. 3,199,267, U.S. Pat. No. 3,854,908, U.S. Pat. No. 3,844,744, and U.S. Pat. No. 3,976,454. All of these patents relate to generally similar scrubber designs in which a centrally located plug can be moved vertically to change the throat dimensions of an outer annular venturi passage by making the venturi passage adjustable, however, these scrubber designs do not provide the highly efficient particle remover capabilities of a fixed-throat venturi passage.

SUMMARY OF THE INVENTION

The present invention maintains a fixed-throat venturi design while adding the adjustability of a plug-type scrubber in order to accommodate larger gas volumes and minimum pressure drop requirements.

The apparatus of the present invention for scrubbing contaminants from a gas stream with a scrubbing liquid comprises a vertically extending cylindrical vessel having an upper gas stream inlet and the lower gas stream outlet. An annular venturi assembly is fixed within the vessel. The assembly forms an annular venturi passage and forms a central opening. A vertically movable plug is supported within the central opening. The plug has a variable cross section and is movable between the position in which the plug closes the central opening and other positions in which portions of the gas stream flow around the plug and through a secondary annular gas flow passage in the central opening. A scrubbing liquid supply means is provided above the plug at the center line of the cylindrical vessel to supply scrubbing liquid to the apparatus.

The annular fixed-throat venturi passage provides high efficiency of particulate removal at a minimum design gas flow rate. When the gas flow rate exceeds the design rate, the plug may be raised to increase the scrubbing capabilities of the apparatus by increasing the gas flow passage cross section, and cleaning the remaining portion of the increased gas flow, thereby increasing the maximum design gas volume. Similarly, for the maximum pressure drop, the total gas flow is directed into the annular venturi passage. For a lower pressure drop, the plug is raised and a portion of the gas passes through the annular secondary passage created around the plug in the lifted position.

Among the advantages of the scrubber of the present invention is that it combines the high efficiency of particulate removal inherent in a fixed-throat venturi scrubber with the compactness, simple construction, and low cost inherent in a plug-type scrubber. The scrubber of the present design also results in approximately up to a 50% savings in energy over that required to operate a plug-type wet scrubber obtaining the same gas cleanliness. Furthermore, the present invention provides the capability of cleaning up to three times the gas volume practically possible with either a plug or venturi scrubber of the same size when operating at the same gas pressure across the scrubber.

DETAILED DESCRIPTION OF A PREFERRED EMBODIMENT

Figure 1:
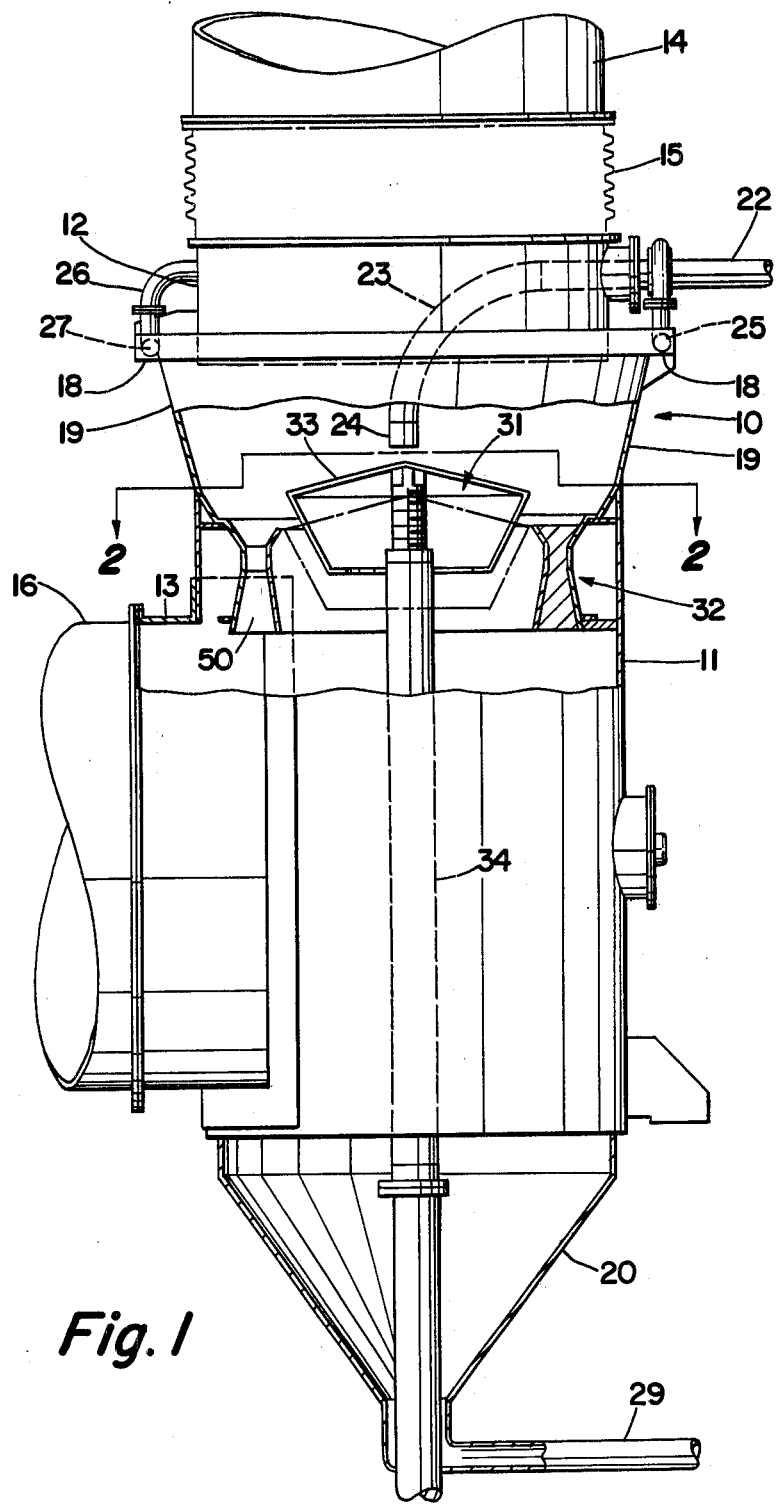
FIG. 1 is a side elevational view partially in section showing the gas scrubber of the present invention.

Referring more particularly to the drawings, FIG. 1 shows a vessel 10 which is generally cylindrical and extends vertically. The vessel 10 has a central cylindrical portion 11 with an upper cylindrical vertically extending gas inlet 12 and a lower cylindrical horizontally extending gas outlet 13. The gas inlet 12 is connected to a conduit 14 by means of an expansion joint 15. Contaminated gas is supplied through the conduit 14 from a source as previously described. The contaminated gas enters through the inlet 12 and flows generally downwardly through the vessel 10 where it is cleaned. Clean gas is discharged to a conventional moisture eliminator through a conduit 16 which is attached to the gas outlet 13.

The vessel 10 includes a horizontally extending ledge 18 which is located directly below the cylindrical gas inlet 12 and which extends radially outwardly beyond the cylindrical inlet 12. A radially inwardly converging portion 19 extends downwardly from the ledge 18 to the central cylindrical portion 11 of the vessel 10. The gas outlet 13 extends horizontally from the central cylindrical vessel portion 11. Below the central cylindrical portion 11 the vessel 10 has a conical bottom portion 20.

Scrubbing liquid is provided to the vessel 10 through a liquid supply line 22. The supply line 22 is connected to a central tube 23 which extends into the vessel 10, curving downwardly to supply a vertical flow of scrubbing liquid within the vessel. The liquid is discharged from the central tube 23 at the center line of the cylindrical vessel through a downwardly projecting outlet 24. The liquid supply line 22 is also connected to a plurality of lines 25 and 26 which supply scrubbing liquid to a plurality of circumferentially spaced tube 27 located around the inside periphery of the vessel 10 directly above the ledge 18. The discharge of the scrubbing liquid from the peripheral tube 27 is horizontal and tangential to the sidewalls of the cylindrical vessel 10. The tubes 27 discharge a portion of the scrubbing liquid onto the ledge 18, so that the liquid flows along the ledge in a substantially circular flow pattern. The scrubbing liquid flows off the ledge 18 and flows around and down the interior side walls of the converging portion 19 of the vessel.

As the clean gas passes horizontally outwardly through the gas outlet 13, the heavier liquid flows downwardly and is collected in the conical bottom portion 20 where it is withdrawn through a liquid outlet line 29. The scrubbing liquid removed through the line 29 is passed to a suitable means for disposal or treatment. The liquid may be physically or chemically processed for regeneration and recycled back to the supply line 22.

The scrubbing liquid is intermixed with the contaminated gas in the upper part of the cylindrical center vessel portion 11 by means which includes a central movable plug assembly 31 surrounded by an outer fixed annular venturi assembly 32. The plug assembly 31 includes a generally frusto-conical vertically movable plug 33 supported on the top of a vertically extending rod 34. The bottom of the rod 34 is attached to suitable actuating means (not shown) for moving the rod vertically. The plug 33 is centrally located within the vessel 10 so that scrubbing liquid from the central tube 23 is discharged through the liquid outlet 24 directly onto the center of the upper surface 35 of the plug 33. The upper surface of the plug 33 slopes downwardly as it extends radially outwardly from a central peak so that liquid discharged from the central tube 23 flows outwardly and evenly over the plug 33.

Figure 2:
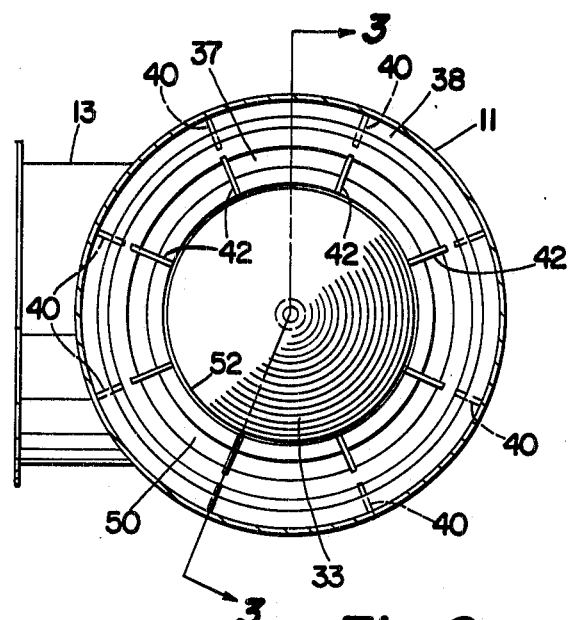
FIG. 2 is a top plan sectional view taken along 2—2 of FIG. 1.
Figure 3:
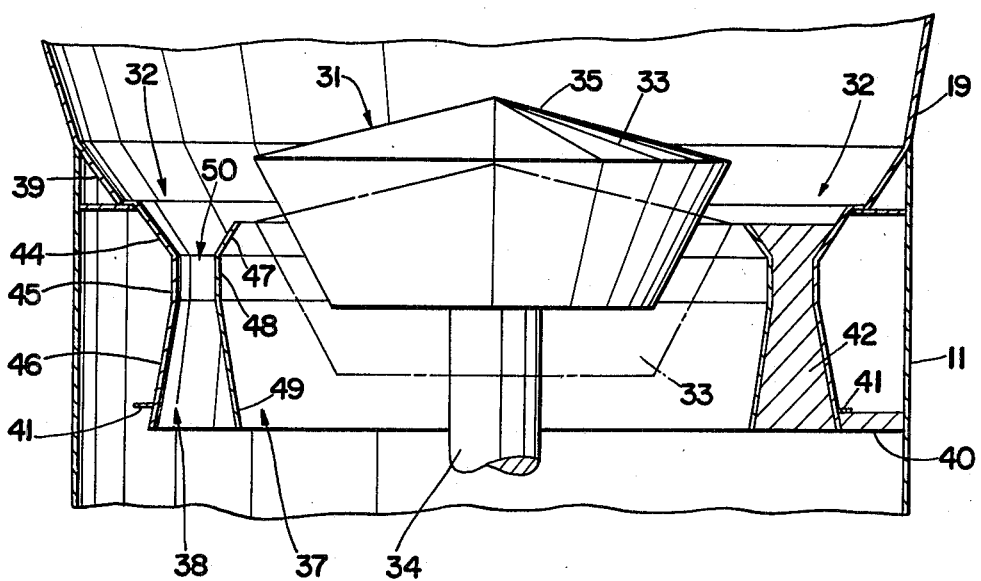
FIG. 3 is a side sectional view taken along line 3—3 of FIG. 2.

Surrounding the plug 33 is the venturi assembly 32 which comprises an inner ring 37 and an outer ring 38. The top of the outer ring 38 is secured to the side wall of the upper part of the central cylindrical vessel portion 11 by an annular upper support bracket 39 located directly below the converging vessel portion 19. At the bottom the outer ring 38 is secured to the vessel side wall by a plurality of lower radially extending support braces 40 (FIGS. 2 and 3) which are circumferentially spaced and attached to a circular flange 41 which extends radially outwardly from the outer ring near the bottom. The inner ring 37 is attached to the outer ring 38 by means of a plurality of radially extending ribs 42 (FIGS. 2 and 3).

The outer ring 38 (FIG. 3) comprises a downwardly converging portion 44, a generally vertical throat portion 45, and a downwardly diverging portion 46. Similarly, the inner ring 37 comprises a downwardly converging portion 47, a vertically extending throat portion 48, and a downwardly diverging portion 49. The outer and inner rings together thus form an annular venturi passage 50 defined by a downwardly converging portion 44 and 47, a vertically extending throat portion 45 and 47, and a downwardly diverging portion 46 and 49. The dimensions of the venturi assembly 47 are selected to provide the desired dimensions of the annular venturi passage 50. The dimensions of the venturi passage 50 are fixed and are adapted for a particular optimum gas flow rate and pressure drop. The ribs 42 are circumferentially spaced within the annular venturi passage 50.

A central circular opening is formed within the inner ring 37 of the venturi assembly 32, and the plug 33 is located within this central opening. The greatest outer diameter of the generally frusto-conical plug 33 is approximately the same as the inner diameter of the top of the inner ring 37 so that the plug 33 closes the central opening within the inner ring 37 in its lower position as indicated in broken lines in FIGS. 1 and 3. The plug 33 may be raised by means of the rod 34 to allow gas to flow around the plug through a secondary annular passage 52 formed between the plug and the inner ring 37 of the venturi assembly. As a result of the generally frusto-conical shape of the plug 33, the cross section of the secondary gas flow passage 52 may be enlarged or reduced by moving the plug 33 up or down.

In the operation of the scrubber of the present invention, contaminated gas from a source is supplied through the conduit 14 and enters the vessel 10 through the gas inlet 12. A minimum design gas flow is directed entirely through the fixed venturi passage 50, and the plug 33 is maintained in its bottom position substantially closing the secondary gas flow passage 52. Scrubbing liquid is supplied from the central tube 23 and discharged through the liquid outlet 24 onto the plug 33 and along the walls of the inner ring 37 of the venturi assembly 32, and scrubbing liquid is supplied through the outer tubes 27 and along the interior wall of the converging portion 19 of the vessel 10 and along the wall of outer ring 38 of the venturi assembly. If the gas flow increases, the plug 33 is moved upwardly a certain distance, opening the secondary gas flow passage 52 a predetermined amount and permitting the additional portion of the gas to flow through the passage 52. Scrubbing liquid from the central tube 23 flows around the outside of the plug and through the passage 52 where it is intermixed with the gas, cleaning the additional portion of the gas flow.

A variable pressure drop is often required in a scrubber due to process requirements and pollutant characteristics. For a maximum pressure drop, the plug 33 is maintained in its lower position, closing the secondary passage 52, so that all of the gas is directed through the fixed venturi passage 50. If a smaller pressure drop is required, the plug 33 is raised to permit some of the gas to pass through the annular secondary passage 52 around the plug. Due to the generally frusto-conical shape of the plug 33, the cross section of the secondary gas passage 52 is variable, and the desired variable pressure drop can be achieved by vertically moving the plug.

Clean gas is passed outwardly through the gas outlet 13 and into the conduit 16 for discharge to a conventional moisture eliminator which separates the scrubbing liquid from the gas, while the remainder of the scrubbing liquid is collected in the conical bottom portion 20 of the vessel. The scrubbing liquid collected in the bottom portion 20 contains captured particulate and some gaseous compound absorbed from the gas stream. The collected liquid is discharged through the outlet line 29 for processing and eventual recirculation to the scrubber.

Various modifications apparent to those skilled in the art may be made in the apparatus disclosed above, and changes may be made with respect to the features disclosed, provided that the elements set forth in any of the following claims or the equivalence of such be employed.

I claim:

1. Apparatus for scrubbing contaminants from a gas stream with a scrubbing liquid, which comprises:
   a vertically extending cylindrical vessel having an upper gas stream inlet and a lower gas stream outlet;
   means for forming an annular venturi gas flow passage fixed within the vessel, said means also forming a central opening;
   a vertically movable plug supported within the central opening, the plug having a variable cross section and being movable between a position in which the plug closes the central opening and other positions in which portions of the gas stream flow around the plug and through a secondary annular gas flow passage formed within the central opening; and
   a scrubbing liquid supply means above the plug at the center line of the cylindrical vessel.

2. Apparatus as in claim 1 in which the plug is generally frusto-conical.

3. Apparatus as in claim 1 wherein the means for forming the venturi passage comprises an inner ring and a generally concentric outer ring, the venturi passage being formed between the inner and outer rings.

4. Apparatus as in claim 3 wherein the inner ring is supported within the outer ring by a plurality of radially extending ribs.

5. Apparatus as in claim 1 wherein the size of the secondary annular gas flow passage is varied by vertical movement of the plug.

6. Apparatus as in claim 1 wherein the plug is supported on top of a vertically extending rod.

7. Apparatus as in claim 1 wherein the scrubbing liquid supply means also includes means for discharging the liquid around the periphery of the cylindrical vessel.

8. Apparatus as in claim 1 wherein the annular venturi gas flow passage includes a downwardly converging portion, a generally vertically extending throat portion and a downwardly diverging portion.

9. Apparatus for scrubbing contaminants from a gas stream with a scrubbing liquid which comprises:
   a vertically extending cylindrical vessel having an upper gas stream inlet and a lower gas stream outlet;
   an assembly comprising an inner ring and a generally concentric outer ring, the outer ring fixed within the vessel and the inner ring supported by a plurality of radially extending ribs between the inner and outer rings, the inner and outer rings forming an annular venturi gas flow passage, the inner ring also forming a central opening;
   a vertically movable plug supported within the central opening on top of a vertically extending rod, the plug being generally frusto-conical with a maximum diameter approximately equal to the central opening formed by the inner ring, the plug being movable from a lower position in which the plug closes the central opening, and various raised positions in which portions of the gas stream flow around the plug through a secondary annular gas flow passage within the central opening, the size of the secondary passage being varied by vertical movement of the plug; and
   scrubbing liquid supply means comprising a discharge tube above the plug at the center line of the cylindrical vessel and a plurality of discharge tubes around the periphery of the vessel.

10. Apparatus as in claim 9 wherein the annular venturi gas flow passage includes a downwardly converging portion, a generally vertically extending throat portion and a downwardly diverging portion.

11. An improved apparatus for scrubbing contaminants from a gas stream with a scrubbing liquid of the type having a vertically extending cylindrical vessel with an upper gas stream inlet and a lower gas stream outlet, means for forming a gas flow passage within the vessel, and a scrubbing liquid supply means above the gas flow passage, wherein the improvement comprises the gas flow passage means including means for forming an annular venturi gas flow passage fixed within the vessel and also forming a central opening, and a vertically movable plug supported within the central opening, the plug having a variable cross section and being movable between a position in which the plug closes the central opening and other positions in which portions of the gas stream flow around the plug and through a secondary annular gas flow passage formed within the central opening.

12. An improved apparatus as in claim 12 wherein the plug is generally frusto-conical.

13. An improved apparatus as in claim 12 wherein the means for forming the venturi passage comprises an inner ring and a generally concentric outer ring, the venturi passage being formed between the inner and outer rings.

14. An improved apparatus as in claim 13 wherein the inner ring is supported within the outer ring by a plurality of radially extending ribs.

15. An improved apparatus as in claim 12 wherein the size of the secondary annular gas flow passage is varied by vertical movement of the plug.

16. An improved apparatus as in claim 12 wherein the plug is supported on top of a vertically extending rod.

17. An improved apparatus as in claim 12 wherein the annular venturi gas flow passage includes a downwardly converging portion, a generally vertically extending throat portion and a downwardly diverging portion.

* * * * *